United States Patent [19]

Kanno et al.

[11] Patent Number: 4,689,149

[45] Date of Patent: Aug. 25, 1987

[54] DEVICE FOR TRANSFER OF MEDICAL SUBSTANCE

[75] Inventors: Michio Kanno, Miyoshi; Mitsumasa Koremura, Fujinomiya, both of Japan

[73] Assignee: Terumo Corporation, Tokyo, Japan

[21] Appl. No.: 623,529

[22] Filed: Jun. 21, 1984

Related U.S. Application Data

[63] Continuation of Ser. No. 441,074, Nov. 12, 1980, abandoned.

[30] Foreign Application Priority Data

Nov. 18, 1981 [JP] Japan .................................. 56-183714

[51] Int. Cl.⁴ .............................................. B01D 13/00
[52] U.S. Cl. .................................. 210/321.3; 210/450
[58] Field of Search ................... 210/450, 433.2, 321.1, 210/321.2, 321.3, 456; 55/16, 158; 422/48

[56] References Cited

U.S. PATENT DOCUMENTS 4,179,380  12/1979  Amicel et al. .................. 210/450 X
4,283,284  8/1981  Schnell ............................ 210/450 X

*Primary Examiner*—Frank Spear

*Attorney, Agent, or Firm*—Frishauf, Holtz, Goodman & Woodward

[57]  ABSTRACT

A medical device for the transfer of substances, includes a cylindrical housing and, a hollow fiber bundle of a plurality of hollow fiber membranes for transfer of the substances which bundle is inserted within the housing. A first substance transfer chamber is defined by the outer surfaces of the hollow fiber membranes and the inner wall surfaces of the housing, and a first substance transferring inlet and an outlet both communicate with the first substance transfer chamber. Partitions are arranged to support fixedly the opposite ends of the hollow fiber membranes in position, and separate the ends from the substance transfer chamber. A second substance transferring fluid inlet and an outlet communicate with the interior spaces of the hollow fiber membranes, which inlet and outlet are formed together with flow path forming members attached to the opposite ends of the housing, wherein each flow path forming member is provided with an annular protuberance. The flow path forming members and the partitions are fastened to each other by sealing interfacial gaps between them with a packing paterial applied to the outer edges of the protuberances of the flow path forming members, so as to contact the packing material with the partitions.

22 Claims, 3 Drawing Figures

DEVICE FOR TRANSFER OF MEDICAL SUBSTANCE

This application is a continuation of application Ser. No. 441,074, filed Dec. 11/12/80 now abandoned.

BACKGROUND OF THE INVENTION

1. Field of the Invention

This invention relates to a medical device for the transfer of substances (or device for transfer of medical substance). More particularly, the present invention relates to improvements in and concerning a medical device for the transfer of substances such as in an artificial lung or artificial kidney.

2. Description of the Prior Art

Various medical devices have been made available to date for the transfer of substances. As one version of an artificial lung, there has been known a hollow fiber type artificial lung which comprises a cylindrical housing, a hollow fiber bundle of a plurality of gas-exchange hollow fiber membranes and inserted within the housing, an oxygen chamber defined by the outer surfaces of the hollow fiber membranes and the inner wall surfaces of the housing, an oxygen inlet and an oxygen outlet both communicating with the oxygen chamber, partitions supporting opposite ends of the hollow fiber membranes fixed in position and isolating them from the oxygen chamber, and a blood inlet and a blood outlet communicating with the interior spaces of the hollow fiber membranes (Japanese Utility Model Disclosure (Jikkai) No. 138,947/1980. As one version of the artificial kidney, there has been known a hollow fiber type artificial kidney which comprises a cylindrical housing, a hollow fiber bundle of a plurality of hollow fiber membranes for dialysis and inserted within the housing, a dialytic chamber defined by the outer surfaces of the hollow fiber membranes and the inner wall surfaces of the housing, a dialytic liquid inlet and a dialytic liquid outlet communicating with the dialytic chamber, partitions supporting opposite ends of the hollow fiber membranes and separating them from the dialytic chamber, and a blood inlet and a blood outlet communicating with the interior spaces of the hollow fiber membranes (Compendium of Chemistry, Vol. 21 "Chemistry of Medical Materials," pages 144–146, published on Nov. 25, 1978 by Gakkai Shuppan Center Ltd.).

In any of these conventional medical devices for the transfer of substances, however, the blood inlet and the blood outlet are formed with headers (blood distribution members) fastened to the opposite ends of the cylindrical housing. Generally for the purpose of preventing leakage of blood, these headers are sealed by being attached as tightly pressed to the partitions through the medium of O-rings of soft rubber fitted in grooves formed in the inner surfaces of the headers along the peripheries thereof. In a device of the kind sealed by this method, however, there is a possibility that, after a prolonged service, the partition materials (potting materials) at the opposite end faces of the device will cave in under the pressure of the O-rings and induce the phenomenon of blood leakage. If the O-rings are not neatly fitted in the aforementioned grooves, no blood leakage will occur immediately after the device has been assembled. When the device is heated as during sterilization with ethylene oxide gas, for example, leakage of blood starts to occur through the O-rings. It is, therefore, difficult for the O-rings to be safely checked for blood leakage before the device is sterilized.

Further, Schnell U.S. Pat. No. 4,283,284 discloses a hollow fiber dialyzer end seal system having an inner sleeve and an outer sleeve at both ends formed coaxially each other, holding each end of a bundle of hollow fibers in the inner sleeve by potting agents, contacting a seal ring of an end closure member with each end of the inner sleeve to fix with an enlarged manifold end by screw means and sealing by injecting a sealant partially into a space formed between the inner and outer sleeves and the end closure member through holes. However, in such end seal system, not only a large amount of the sealant is required because of large space, but also it is feared that a dialytic solution may leak through a gap between the enlarged manifold ends and the outer sleeves to invade into the space because the space lacks the sealant. Further, the potting agent contracts after curing, so it is feared that the dialytic solution leaks into a space between the potting agent and the end closure member through the gap between the inner sleeve and the potting agents.

An object of the present invention, therefore, is to provide a medical device for the transfer of substances which is provided with a highly reliable, safe sealing structure.

SUMMARY OF THE INVENTION

The object described above is accomplished by a medical device for the transfer of substances, comprising a cylindrical housing, a hollow fiber bundle of a plurality of hollow fiber membranes for transfer of the substances and inserted within the housing, a first substance transfer chamber defined by the outer surfaces of the hollow fiber membranes and the inner wall surfaces of the housing, a first substance transferring inlet and outlet both communicating with the first substance transfer chamber, partitions supporting opposite ends of the hollow fiber membranes fixed in position and separating them from the first substance transfer chamber, and a second substance transferring fluid inlet and outlet communicating with the interior spaces of the hollow fiber membranes and formed with flow path forming members attached to opposite ends of the housing and provided each with an annular protuberance, which device is characterized by having the flow path forming members and the partitions fastened to each other by sealing the interfacial gaps therebetween with a packing material applied to the outer edges of the protuberances of the flow path forming members, so as to contact the packing material with the partitions.

In a preferred embodiment of the invention, the protuberances of the flow path forming members are continuous raised strips which are held fixed to the flow path forming members, and the packing material is applied to fill up the gaps formed by the strips, the portions of the flow path forming members excluding the strips, and the partitions. The packing material is injected into the gaps through at least two holes bored in each of the flow path forming members so as to communicate with the gaps formed between the flow path forming members and the partitions. The packing material now filling the gaps is left standing until complete cure. The packing material is made of a homogeneous, substance especially the same substance as the potting material which is used in the formation of the partitions. The flow path forming members are made preferably of polycarbonate.

PREFERRED EMBODIMENT OF THE INVENTION

Figure 1:
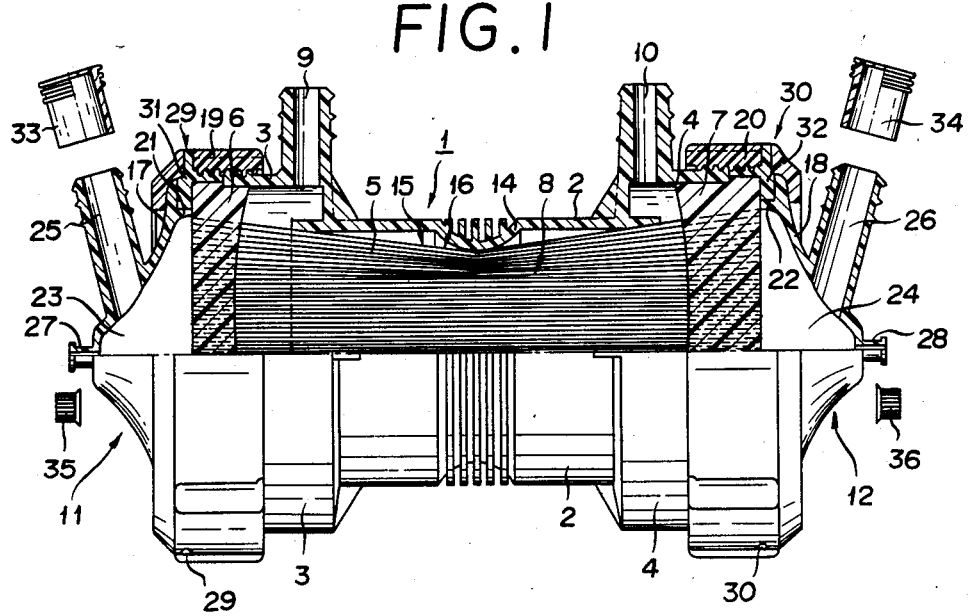
FIG. 1 is a partially sectioned side view of one preferred embodiment of the medical device of the present invention for the transfer of substances.

FIG. 1 represents a hollow fiber type artificial lung as a typical medical device for the transfer of substances according to the present invention. That is to say, the hollow fiber type artificial lung of this invention has a housing 1, and the housing 1 is provided, at opposite ends of a cylindrical main body 2 which forms a part of the housing, with annular male screw thread fitting covers 3, 4. Inside the housing 1, a multiplicity, specifically on the order of 10,000 to 60,000 in total, of gas-exchange hollow fiber membranes 5 are parallelly arranged, while mutually separated, longitudinally to full capacity. Inside the annular fitting covers 3, 4, the opposite ends of the gas-exchange hollow fiber membranes 5 are water-tightly supported in position by a first partition 6 and a second partition 7 in such a manner that the openings of the individual membranes may not be blocked. The partitions 6, 7 define and enclose an oxygen chamber 8 in conjunction with the outer surfaces of the hollow fiber membranes 5 and the inner wall surfaces of the housing 1. The partitions further separate the oxygen chamber 8 from cavities or interior spaces formed inside the gas-exchange hollow fiber membranes 5 for passage of blood (not shown).

The annular fitting cover 3 is provided with an inlet 9 for supply of oxygen which is a first fluid for transferring a substance, and the other annular fitting cover 4 is provided with an outlet for discharge of oxygen.

The cylindrical main body 2 of the housing 1 preferably is provided on the inner wall surface thereof with a constricting member 14 protruding at a position halfway along the axial length thereof. To be specific, the constricting member 14 is integrally formed with the cylindrical main body 2 on the inner wall side of the main body, so as to squeeze the overall periphery of the hollow fiber bundle 15 comprising the multiplicity of hollow fiber membranes 5 inserted axially in the interior of the cylindrical main body 2. Thus, the hollow fiber bundle 15 is constricted at a point falling halfway along the axial length thereof as illustrated in FIG. 1 to form a squeezed portion 16. The packing ratio of the hollow fiber membranes 5 continuously varies in the axial direction thereof, reaching the maximum at the center. For a reason to be described later, the values of packing ratio at varying points are desired to be as follows. First, the packing ratio in the squeezed portion 16 at the center is about 60 to 80%, that inside the cylindrical main body 2 about 30 to 60%, that at the opposite ends of the hollow fiber bundle 15, namely on the outside of the partitions 6, 7 about 20 to 40%.

The hollow fiber membranes 5 are made of porous polyolefin resin such as, for example, polypropylene resin or polyethylene resin. Among other polyolefin resins, the polypropylene resin proves particularly desirable. These hollow fiber membranes 5 can be obtained in a form containing numerous pores interconnecting the inside and the outside of the partition. The inside diameter is about 100 to 1,000 $\mu$m, the wall thickness is about 10 to 50 $\mu$m, the average pore diameter is about 200 to 2,000 Å, and the porosity is about 20 to 80%. In the hollow fiber membranes made of such a polyolefin resin, the resistance the membranes offer to the movement of a gas therein is small and the capacity of the membranes for gas exchange is notably high because the gas moves therein in a voluminal flow. Optionally, the hollow fiber membranes may be made of silicone.

The hollow fiber membranes 5 made of porous polypropylene or polyethylene are not directly used in their unmodified form in the artificial lung but preferably have their surfaces, which are destined to contact blood, coated in advance with an antithrombotic material. For example, the surfaces may be treated with such a material as polyalkyl sulfone, ethyl cellulose or polydimethyl siloxane which excels in gas permeability, so as to be coated with a film of this material in a thickness of about 1 to 20 $\mu$m. In this case, possible dispersion of water vapor from the blood under treatment may be precluded by allowing the produced film of this material to cover the pores in the membranes to such an extent that no adverse effect will be exerted on the previousness of the hollow fiber membranes 5 to gases. Generally during the operation of the artificial lung, the pressure on the blood side is higher than that on the oxygen side. There are times when this relationship may be reversed for some cause or other. If this reversal occurs, there may ensue the possibility of microbubbles flowing into the blood. When the hollow fiber membranes have their pores coated with an antithrombotic material as described above, this possibility is completely avoided. Of course, this coating is also useful for preventing the blood from coagulation (occurrence of microclots).

Now, the formation of the partitions 6, 7 will be described. As described above, the first and second partitions 6, 7 fulfil an important function of isolating the interiors of the hollow fiber membranes 5 from the ambience. Generally, the partitions 6, 7 are produced by centrifugally casting a high molecular potting agent of high polarity such as, for example, polyurethane, silicone or epoxy resin, in the inner wall surfaces at the opposite ends of the housing 1 and allowing the cast potting agent to cure in place. To be more specific, a multiplicity of hollow fiber membranes 5 of a length greater than the length of the housing 1 are prepared and, with their opposed open ends filled up with a highly viscous resin, disposed parallelly within the cylindrical main body 2 of the housing 1. Then, the opposite ends of the hollow fiber membranes 5 are completely concealed with mold covers of a diameter greater than the diameter of the fitting covers 3, 4. The high molecular potting agent is cast through the opposite ends of the housing 1 at the same time that the housing 1 is rotated about its own axis. After the resin has been cast and cured fully, the mold covers are removed and the outer surface portions of the cured resin are cut off with a sharp cutter to expose the opposite open ends of the hollow fiber membranes 5 to view. Consequently, there are formed the partitions 6, 7.

In the embodiment described above, since the hollow fiber bundle 15 is constricted at the central portion by the constricting member 14 and expanded toward the opposite ends thereof, the packing ratio of hollow fiber membranes 5 is increased in the squeezed portion 16 and, at the same time, the individual hollow fiber membranes 5 are uniformly dispersed inside the cylindrical main body 2. Consequently, the oxygen gas is allowed to form a uniformly dispersed, stable current as compared with a hollow fiber bundle which lacks the squeezed portion 16. This means that the efficiency of exchange of oxygen for carbon dioxide gas is improved. Further, since the internal cross section of the housing 1 is suddenly changed in the squeezed portion 16 at the center, the flow rate of the oxygen gas in this portion is suddenly changed. Thus, the constriction of the hollow fiber bundle 15 is effective in increasing the flow rate of the oxygen gas and heightening the speed of movement of the carbon dioxide gas as well.

The packing ratio of hollow fiber membranes 5 in the squeezed portion 16 is preferably fixed in the range of about 60 to 80% for the following reason. If the packing ratio is less than about 60%, part of the hollow fiber membranes 5 are not squeezed by the constricting member 14. Consequently, the performance of the hollow fiber membranes is impaired because they are unevenly distributed to an extent of inducing the phenomenon of channeling. Further, there is posed a problem that the hollow fiber bundle 15 cannot be accurately disposed at the center of the cylindrical main body with ease. If the packing ratio is more than about 80%, those of the hollow fiber membranes 5 held in direct contact with the constricting member 14 are depressed so powerfully as to be crushed. Consequently, blood fails to flow through the crushed hollow fiber membranes, lowering the overall efficiency of the hollow fiber bundle and inducing the phenomenon of blood stagnation. Moreover, during the assembly of the artificial lung part, the constricting member 15 permits no easy passage of the hollow fiber bundle 15, making the work very difficult.

The packing ratio of hollow fiber membranes inside the cylindrical main body 2 has been fixed in the range of about 30 to 60% for the following reason. If the packing ratio is less than about 30%, the hollow fiber membranes 5 are deviated to one side in the interior of the cylindrical main body 2 and, consequently, the efficiency of exchange of oxygen gas for carbon dioxide gas is degraded. The work involved also becomes difficult. If the packing ratio is more than about 60%, mutual contact of hollow fiber membranes 5 occurs and exerts an adverse effect upon the performance of the hollow fiber bundle.

The packing ratio of hollow fiber membranes outside the partitions 6, 7 has been fixed in the range of about 20 to 40% for the following reason. If this packing ratio is less than about 20%, the uniformity of the distribution of hollow fiber membranes 5 at the opposite open ends tends to be degraded by reason of workmanship. Consequently, such problems as nonuniform blood flow distribution and blood clotting ensue. If the packing ratio is more than about 40%, mutual contact of hollow fiber membranes 5 occurs and prevents the potting agent, the materials for the first and second partitions 6, 7, from being evenly cast throughout the entire inner wall surfaces at the opposite ends of the cylindrical main body. Consequently, the produced partition 6, 7 will suffer from leakage.

In the embodiment so far described, only the constricting member 14 is partially projected from the inner wall surface of the housing 1. This is not necessarily the sole means of imparting required constriction upon the hollow fiber bundle. It may be otherwise obtained by separately forming a ring-shaped constricting member and fitting it in position on the interior of the cylindrical main body. It may be obtained by forming an annular recess at the center of the cylindrical main body. Optionally, the cylindrical main body may be gradually converged inwardly from the opposite ends thereof so that the inside diameter thereof reaches its minimum at the center and its maximum at the opposite ends.

The outer surfaces of the partitions 6, 7 are respectively covered with flow path forming members 11, 12 which are each provided with an annular protuberance. The flow path forming members 11, 12 are composed respectively of liquid distributing members 17, 18 and screw rings 19, 20. On the liquid distributing members 17, 18 along their peripheries, there are provided continuous raised strips 21, 22 in the shape of annular protuberances. By holding the edge faces of these continuous raised strips fixed against the aforementioned partitions and fastening the screw rings 19, 20 through helical insertion to the fitting covers 3, 4, there are formed an inlet chamber 23 and an outlet chamber 24 for blood as a second substance transferring fluid. In the flow path forming members 11, 12, inlets 25, 26 for blood as the second substance transferring fluid, and holes for discharge of air are provided.

The gaps formed round the peripheries of the partitions 6, 7 between the partitions 6, 7 and the flow path forming members 11, 12 are sealed by being filled up with packing agents 31, 32 introduced via at least two holes 29, 30 communicating with the gaps, so as to contact the partitions 6, 7.

The packing material to be used in the present invention must be in a liquid or some other similar state, so as to exhibit ample flowability when it is injected through the holes 29, 30 into the vacant portion. Thus, it is preferably made of rigid resin which exhibits high adhesiveness at least to the flow forming members 11, 12 and the partitions 6, 7. As the packing material, a potting agent of high polarity such as, for example, polyurethane, silicone or epoxy resin which is similar to the potting agent generally used to make the partitions 6, 7 is available. Particularly, polyurethane gives desirable results. Further, as the material for flow forming member 11, 12, polycarbonate is preferable.

Among the different types of polyurethane adhesive agents, the prepolymer adhesive agent, the polyisocyanate adhesive agent and the isocyanate-modified polymer are advantageously used. Generally, the prepolymer adhesive agent is a preferred choice. A typical prepolymer adhesive agent is produced by mixing a prepolymer formed of 4,4'-diphenyl methane diisocyanate and a bifunctional caster oil derivative (such as, for example, polypropylene glycol ester of ricinoleic acid, having a molecular weight of 540) (with a NCO/OH ratio in the range of 1:1 to 1:1.5) with a curing agent formed of a mixture of a bifunctional castor oil derivative, a polyfunctional polypropylene glycol (having a molecular weight of 2,000 to 3,000, and an amino alcohol (50–70:15–25:15–25 by weight ratio) in a weight ratio of 65:35 to 59:41, for example, so as to equalize substantially the numbers of functional groups involved. This prepolymer adhesive agent is capable of cold curing, possesses moderate elasticity, and excels in adhesiveness.

In the preferred embodiment of FIG. 1, the openings are fitted with respective caps 33, 34, 35 and 36.

Figures 2, 3:
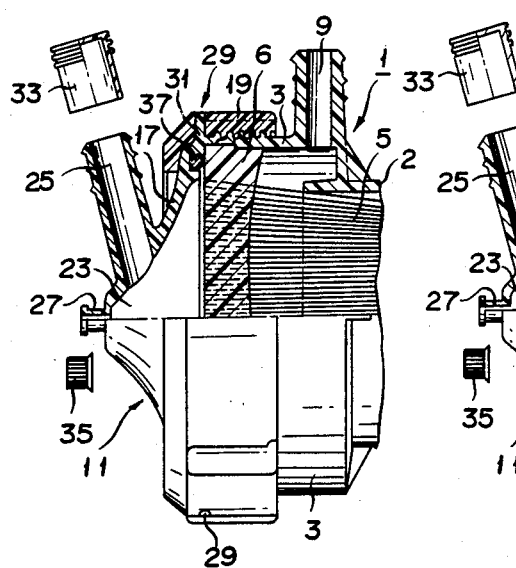
FIG. 2 is a partially sectioned side view of the sealing portion in another preferred embodiment of the present invention.
FIG. 3 is a partially sectioned side view of the sealing portion in yet another preferred embodiment of the present invention.

FIG. 2 represents another preferred embodiment of this invention. Here, the annular protuberance formed on the liquid distributing member 17 along the periphery thereof comprises a continuous raised strip 21 and an O-ring 37 formed outside the continuous raised strip 21. The sealing of the device is accomplished by filling with the packing material 31 the gap which is formed by the O-ring, the portion of the flow path forming member other than the O-ring, and the partition. The same numerical symbols found in FIG. 2 as those used in FIG. 1 denote like parts.

FIG. 3 represents a further preferred embodiment of the present invention. In an artificial lung similar to the artificial lung illustrated in FIG. 1, the flow path forming member 11 is inserted in such a manner that the continuous raised strip 21 formed as an annular protuberance on the inner surface of the flow path forming member 11 along the periphery thereof, may come into contact with the partition 6 at one end of the cylindrical main body 2 instead of forming any screw thread on the inner surface of the ring part of the flow path forming member 11 composed integrally of a liquid distributing member and a ring member. The sealing of the device is accomplished by filling with the packing material 38 the gap formed by the flow path forming member 11, the partition 6, and the end part of the cylindrical main body 2.

The filling of the gap with the packing material, when the packing material has high viscosity, may be accomplished by having the packing material applied in advance to the inner surface of the flow path forming member 11 and inserting the flow path forming member 11 into the cylindrical main body 2. When the packing material has low viscosity, it may be accomplished by injecting the packing material into the gap through the hole 29 (or a gap 39 where the hole 29 is not formed) after the insertion of the flow path forming member 11 into the cylindrical main body 2. Then, the flow path forming member is set in its final position with the aid of a jig and the packing material now filling the gap is solidified by cold curing, hot curing, fusion with ultrasonic waves, or thermal fusion. The same numerical symbols found in FIG. 3 as those used in FIG. 1 denote like parts.

The invention has been described as embodied in the artificial lung. When the artificial lung so embodying this invention is put to use with a heat exchanger coaxially connected thereto as proposed by Japanese Patent Application No. 115,868/1980, the flow path forming member to be used on the free end (the end opposite the end continuous with the artificial lung), can be similarly sealed as contemplated by this invention.

By using hollow fiber membranes made of cellulose regenerated by the cuprammonium process, cellulose regenerated by the acetocellulose process, a stereocomplex of polymethyl methacrylate, polyacrylonitrile or ethylene-vinyl alcohol copolymer in a device for the transfer of a medical substance similar in structure to the artificial lung described above, there is obtained an artificial kidney.

The device for the transfer of a medical substance constructed as described above according to the present invention is put to use as incorporated in an external circulation path for blood, for example, which is the second substance transferring fluid. In the case of the artificial lung, for example, the blood delivered by a blood pump (not shown) is introduced through the blood inlet 25, passed through the blood inlet chamber 23 and the interiors of the hollow fiber membranes. During this passage, the blood is impregnated with the oxygen gas introduced via the inlet 9 into the substance transfer chamber 16 and is divested of carbon dioxide gas. Then, the blood is forwarded via the blood outlet chamber 24 and discharged through the blood outlet 26. The oxygen within the substance transfer chamber 16 is discharged in conjunction with carbon dioxide gas through the outlet 10. The artificial kidney is operated on substantially the same principle, except that a dialytic fluid is used in the place of oxygen.

Further, on one hand, blood can be introduced from the inlet 9 to the substance transfer chamber 16, and exhausted from the outlet 10. On the other hand the substance transferring fluid, e.g., oxygen can be introduced from the inlet chamber 23 into the hollow fibers 5 and exhausted from the outlet chamber 24.

As described above, the present invention resides in sealing a medical device for the transfer of substances by filling the gaps formed round the peripheries of the flow path forming members, at opposite ends of the device, with a packing material thereby fastening the aforementioned flow path forming members to partitions at the end portions of the device. Thus, the packing material seals the device perfectly and precludes liquid leakage through lines or junction faces completely. This invention makes possible a notable cost cut because it permits omission of O-rings which have been indispensable components for the conventional device. It further offers an advantage that the packing material is not easily broken by shocks possibly exerted upon the screw ring, because the material remains concealed in the gap. Optionally, the liquid distributing member and the ring may be integrally formed to obviate the necessity of using a screw thread. This fact again contributes to cut costs.

What is claimed is:

1. A medical device for the transfer of substances, comprising:
   a cylindrical housing having an outer cylindrical end portion on each of opposite ends thereof,
   a fiber bundle including a plurality of elongated hollow fiber membranes for the transfer of substances, said hollow fiber membranes having open ends at opposite ends thereof, said fiber bundle being within said housing and extending between opposite ends of said housing to define a first substance transfer chamber between the outer surfaces of said hollow fiber membranes and the inner wall surfaces of said housing,
   a first substance transferring inlet and a first substance transferring outlet both for communicating with said first substance transfer chamber,
   first and second partitions for supporting the opposite open ends of said hollow fiber membranes in a fixed position and for separating said open ends from said first substance transfer chamber,
   a second substance transferring fluid inlet and a second substance transferring fluid outlet both for communicating with interior spaces of said hollow fiber membranes,
   first and second flow path forming members attached to the opposite ends of said housing, said flow path forming members each comprising a corresponding one of said fluid inlet and said fluid outlet and being provided each with an annular protuberance on a side facing one of said opposite ends of said housing to confront and directly contact and bear against a corresponding one of said partitions in fluid sealing relation, said first and said second partitions each having diameters greater than those of the confronting annular protuberances on the corresponding flow path forming members so that portions of said partitions without said hollow fiber membranes extend radially outwardly of the confronting protuberances; and a packing and sealing material for adhesively sealing interfacial gaps between each of said flow path forming members, the opposite ends of said housing and the corresponding ones of said partitions, said packing and sealing material being made of a material which is homogeneous with the material from which said partitions are made so as to fluid-tightly adhere to said partitions, said flow path forming members and said partitions being adhesively fastened to each other by said packing and sealing material which adhesively and fluid-tightly contacts outer edges of said protuberances of said flow path forming members, said outer cylindrical portion on the opposite ends of said housing and the portions of said partitions which extend radially outwardly of said confronting protuberances.

2. A medical device for the transfer of substances according to claim 1, wherein said protuberances on the flow path forming members are continuous raised strips, and said continuous raised strips are fixed to said partitions, and said packing material is placed to fill up gaps formed by said flow path forming members and said partitions so as to communicate with vacant portions defined by said raised strips, portions of said flow path forming members other than said raised strips, and said partitions.

3. A medical device for the transfer of substances according to claim 1, wherein each of said flow path forming members has at least one hole bored therein and said packing material is injected through the holes in said flow path forming members so as to communicate with said gaps between said flow path forming members and said partitions, and said packing material is cured in place.

4. A medical device for the transfer of substances according to claim 1, wherein one of said first and said second substance transferring fluid is blood.

5. A medical device for the transfer of substnaces according to claim 4, wherein parts of the device are arranged for the transfer of a medical substance to operate as an artificial lung.

6. A medical device for the transfer of substances according to claim 5, wherein said hollow fiber memberanes are porous polyolefin resin membranes.

7. A medical device for the transfer of substances according to claim 4, wherein parts of said device are arranged for the transfer of a medical substance to operate as an artificial kidney.

8. A medical device for the transfer of substances according to claim 1, wherein said packing material has a high viscosity and high flowability at the time it is placed in said interfacial gaps.

9. A medical device for transfer of substances according to claim 1, wherein said packing and sealing material is made of substantially the same material as the material from which said partitions are made.

10. A medical device for the transfer of substances according to claim 9, wherein said flow path forming members are made of polycarbonate.

11. A medical device for the transfer of substances according to claim 9, wherein said partitions comprise a potting material made of a substance selected from the group consisting of silicone and epoxy resin.

12. A medical device for the transfer of substances according to claim 9, wherein said partitions comprise a potting material made of polyurethane.

13. A medical device for the transfer of substances according to claim 12, wherein said polyurethane is one member selected from the group consisting of prepolymer adhesive agent, polyisocyanate adhesive agent, and isocyanate modified polymer.

14. A medical device for the transfer of substances according to claim 13, wherein said polyurethane is prepolymer adhesive.

15. A medical device for the transfer of substances according to claim 14, wherein said prepolymer adhesive is a mixture of a prepolymer comprising 4,4'-diphenyl methane diisocyanate and a bifunctional castor oil derivative with a curing agent formed of a mixture of a bifunctional castor oil derivative, a polyfunctional polypropylene glycol and amino alcohol.

16. A medical device for the transfer of substances, comprising:

a cylindrical housing having an outer cylindrical portion on each of opposite ends thereof, a fiber bundle including a plurality of elongated hollow fiber membranes for the transfer of substances, said hollow fiber membranes having open ends at opposite ends thereof, said fiber bundle being within said housing and extending between opposite ends of said housing to define a first substance transfer chamber between the outer surfaces of said hollow fiber membranes and the inner wall surfaces of said housing, a first substance transferring inlet and a first substance transferring outlet both located on said cylindrical housing for communicating with said first substance transfer chamber, first and second partitions for supporting the opposite open ends of said hollow fiber membranes in a fixed position at the opposite ends of said cylindrical housing and for separating said open ends from said first substance transfer chamber, each of said partitions being formed of a resilient material;

a second substance transferring fluid inlet and a second substance transferring fluid outlet both for communicating with interior spaces of said hollow fiber membranes, first and second flow path forming members attached to the opposite ends of said housing, said flow path forming members each comprising a corresponding one of said second fluid inlet and said second fluid outlet and being provided each with an annular protuberance on a side facing one of said opposite ends of said housing for directly contacting and bearing against a confronting end of a corresponding one of said partitions in fluid sealing relation, said annular protuberances, the corresponding partition and flow path forming member defining a second substance transfer chamber in communication with said interior spaces of said fiber membranes and separate from said first substance transfer chamber, said first and second partitions each having diameters greater than those of the confronting annular protuberances on the corresponding flow path forming members so that portions of said partitions without said hollow fiber membranes extend radially outwardly of the confronting protuberances, and a packing and sealing material for adhesively sealing interfacial gaps between each of said flow path forming members, the opposite ends of said housing and the corresponding ones of said partitions, said packing and sealing material being made of a material which is homogeneous with the material from which said partitions are made so as to fluid-tightly adhere to said partitions, said flow path forming members and said partitions being adhesively fastened to each other by said packing and sealing material which adhesively and fluid-tightly contacts outer edges of said protuberances of said flow path forming members, said outer cylindrical portion on the opposite ends of said housing and the portions of said partitions which extend radially outwardly of said confronting protuberances.

17. A medical device for transfer of substances according to claim 16, wherein said protuberances on the flow plath forming members are continuous raised strips, and said continuous raised strips are fixed to said partitions, and said packing material is placed to fill up gaps formed by said flow path forming members and said partitions so as to communicate with vacant portions defined by said raised strips, portions of said flow path forming members other than said raised strips, and said partitions.

18. A medical device for the transfer of substances according to claim 16, wherein each of said flow path forming members has at least one hole bored therein and said packing material is injected through the holes in said flow path forming members so as to communicate with said gaps between said flow path forming members and said partitions, and said packing material is cured in place.

19. A medical device for the transfer of substances according to claim 16, wherein parts of the device are arranged for the transfer of a medical substance to operate as an artificial lung.

20. A medical device for the transfer of substances according to claim 16, wherein parts of said device are arranged for the transfer of a medical substance to operate as an artifical kidney.

21. A medical device for the transfer of substances according to claim 16, wherein said packing, material has a high viscosity and high flowability at the time it is placed in said interfacial gaps.

22. A medical device for transfer of substances according to claim 16, wherein said packing and sealing material is made of substantially the same material as the material from which said partitions are made.

* * * * *